W. P. Welch,
Band Saw Mill.
Nº 78,905. Patented June 16, 1868.
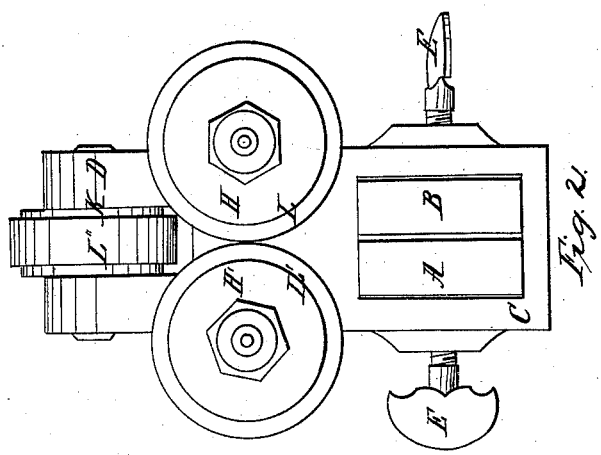
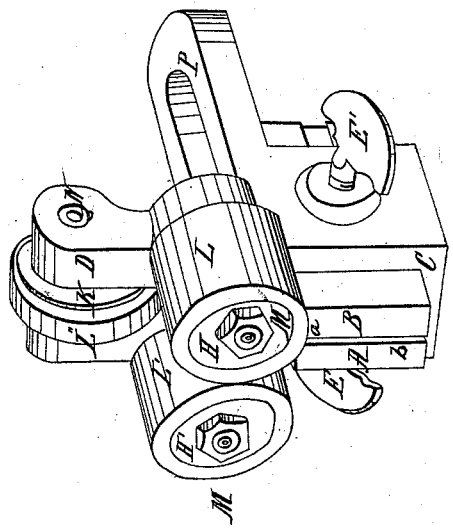
Witnesses:
Frank G. Parker
William _____
Inventor:
Wm. P. Welch

United States Patent Office.

WILLIAM P. WELCH, OF BOSTON, MASSACHUSETTS.

Letters Patent No. 78,905, dated June 16, 1868.

IMPROVEMENT IN GUIDES FOR BAND-SAWS.

*The Schedule referred to in these Letters Patent and making part of the same.*

TO ALL WHOM IT MAY CONCERN:

Be it known that I, WILLIAM P. WELCH, of Boston, in the county of Suffolk, and State of Massachusetts, have invented certain new and useful Improvements in Guides for Band-Saws; and I do hereby declare that the following is a full and exact description thereof, reference being had to the accompanying drawings and to the letters of reference marked thereon.

To enable others skilled in the art to make and use my invention, I will proceed to describe its nature, construction, and operation.

My invention relates to an improvement in adjustable guides for band-saws, and it consists in the arrangement of elastic frictional rollers in an adjustable guide-block, and having a rigid guide-way in which the saw is guided to the wood to be sawed, the whole being so devised and arranged that the band-saw is directed into the said guide by elastic yielding surfaces, which are amply sufficient to direct the saw, but are still so yielding that the "slatting" or "hammering" of the saw upon them, caused by the rapid motion, will not injure the saw.

*Drawings.*

Figure 1 is a perspective view, and

Figure 2 is a front elevation of my improved guide for band-saws.

C D is an adjustable block, in which are arranged the guide-rollers and cheeks A and B.

A and B are two blocks, technically called "cheeks," of hard wood, or of some other suitable material, arranged as shown in the drawings, with a narrow crevice, $a\ b$, between them, in which the band-saw runs. These "cheeks," A B, are held and adjusted by the screws, E E', and serve as the rigid guide for the saw.

H H' are two wheels, hung as shown in the drawings, and covered by a thick elastic coating, L L'. These wheels serve as a directing-guide for the saw, which passes between them before it enters the rigid guide A B.

K L'' is a third guide-wheel, made like the other two; but revolving upon an axis placed at right angles to the axes of the other wheels, as represented in the drawings. The object of this last-named wheel is to form a guide for the back of the saw.

The advantages that I claim for my arrangement are, that the saw is first brought into line and steadied by elastic yielding surfaces, which are incapable of injuring the saw; then, when brought into perfect line and made to run steadily, it enters the rigid guide, which will not injure the saw when thus running steadily and in line.

Where rigid guides alone are used, the saw injures itself by "slatting" against the "cheeks," while elastic guides alone are found insufficient for properly holding the saw while working.

Having thus described my invention, I will now set forth my claim.

What I claim as my invention, and desire to secure by Letters Patent of the United States, is—

The adjustable guide-block C D, having the elastic guide-rollers, L, L', and L'', arranged in relation to each other and cheeks A B, all constructed and operating in the manner and for the purpose substantially as described.

WM. P. WELCH.

Witnesses:
FRANK G. PARKER,
WILLIAM EDSON.